No. 618,952. Patented Feb. 7, 1899.
C. CRÉTIN.
METAL CUTTING MACHINE.
(Application filed May 26, 1898.)
(No Model.)
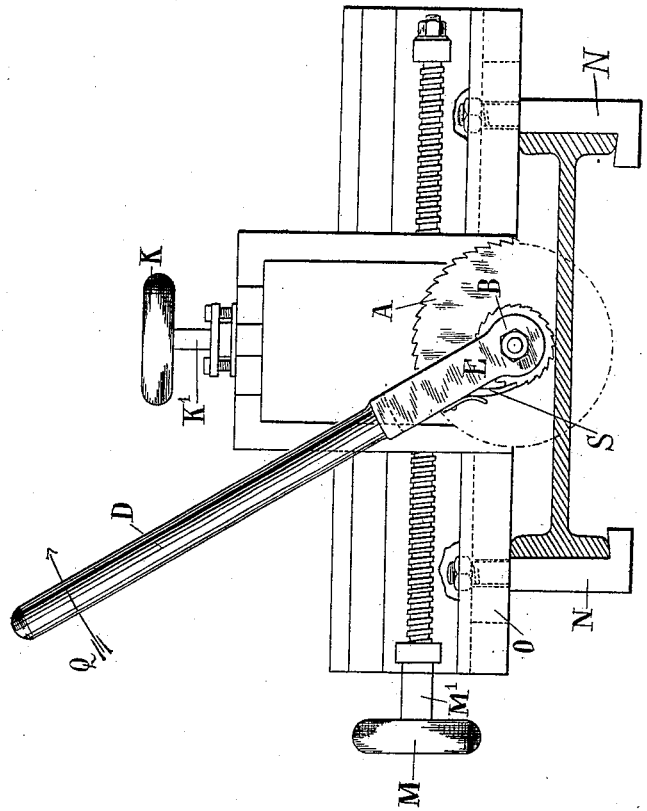
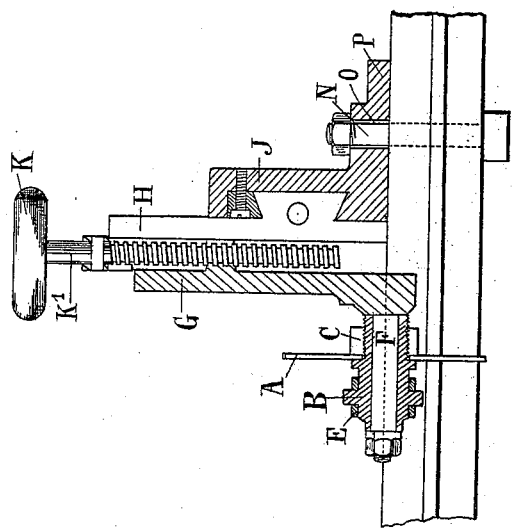
Witnesses
Jas. A. Richmond
H. Becker
Inventor
Charles Crétin
by G. Dittmar
his Attorney

UNITED STATES PATENT OFFICE.

CHARLES CRÉTIN, OF ST. CLAUDE, FRANCE.

METAL-CUTTING MACHINE.

SPECIFICATION forming part of Letters Patent No. 618,952, dated February 7, 1899.

Application filed May 26, 1898. Serial No. 681,829. (No model.)

*To all whom it may concern:*

Be it known that I, CHARLES CRÉTIN, a citizen of the French Republic, residing at St. Claude, in the Department of Jura, France, have invented certain new and useful Improvements in Metal-Cutting Machines; and I do hereby declare the following to be a full, clear, and exact description of the invention, such as will enable others skilled in the art to which it appertains to make and use the same.

The present invention has reference to a circular metal-cutting saw fixed to the ratchet-wheel of a pawl-lever, which operates same by imparting thereto an intermittent rotation, combined with a forward feeding motion of the saw perpendicularly to the axis of the latter, so that the saw will not follow the pawl in its backward rotation and not be carried with it in the forward rotation.

In the accompanying drawings I have illustrated one of the forms my invention may assume, in which—

Figure 1 is a front view, and Fig. 2 a cross-section.

A designates the saw, which is circular in form and is secured to the boss B of a ratchet-wheel by means of a nut C. The boss E of the pawl D is loosely mounted on the boss B of the ratchet-wheel. B turns itself loosely on the rigidly-mounted axis F, which is connected perpendicularly to a sliding support G, sliding itself in another sliding support H, which slides perpendicularly with respect to G in a fixed support J. The respective movements of the two slides G and H are imparted by the wheels K M and the screws K' M'. Owing to these two supports the position of the saw can be varied in both directions and to perform any work as desired.

In Fig. 1 the saw is shown as operating on an I-iron that is about to be cut. The support J is fixed crosswise, either normally or obliquely to the I-iron beam, according to whether the cut is to be performed straight across or obliquely, by means of two screw-cramps N, movable, as desired, in a longitudinal groove O, made in the angle-base P of the support J.

The operation of the apparatus is very simple. By pushing the lever in the direction of the arrow Q the movable tooth S of the pawl will slip over the teeth of the ratchet-wheel, while in the other direction S will engage the teeth of the latter, and thus produce the rotating motion. At the same time by pushing forward the slide-support H or G the desired work will be effected.

As an example of the rapidity of the work, a man will be able to cut a rail of forty-five kilos per meter within less than an hour and without strain. The section is straight, sharp, and ready for adjustment, no filing being required to straighten same.

I claim—

1. A machine such as described, embodying a supporting-base, a stationary support carried thereby, a frame slidably mounted therein, a slide vertically movable in said frame, a shaft rigidly secured to said frame perpendicularly thereof, a ratchet-wheel rotatably mounted on said shaft and provided with a boss or prolongation, a circular saw rigid on said boss and a pawl loosely received on said boss provided with a tooth for engagement with said ratchet-wheel, substantially as described.

2. In combination, a supporting-base, a stationary support carried thereby, a frame slidably mounted therein, a slide vertically movable in said frame, a shaft rigidly secured to said frame, perpendicularly thereof, a ratchet-wheel rotatably mounted on said shaft and provided with a boss or prolongation, a saw rigid on said boss, a pawl loosely received on said boss provided with a tooth for engagement with said ratchet-wheel and means for adjusting the working position of said saw, substantially as described.

In testimony whereof I affix my signature in presence of two witnesses.

CHARLES CRÉTIN.

Witnesses:
LOUIS D. FONTMAN,
C. DURPING.